United States Patent [19]

Jung

[11] Patent Number: 5,687,037
[45] Date of Patent: Nov. 11, 1997

[54] VIDEO TAPE RECORDER FOR LONG-PLAY MODE RECORDING/REPRODUCING

[75] Inventor: Tae-hwa Jung, Kwangmyung, Rep. of Korea

[73] Assignee: Samsung Electronics Co., Ltd., Kyungki-do, Rep. of Korea

[21] Appl. No.: 471,685

[22] Filed: Jun. 6, 1995

[30] Foreign Application Priority Data

Jul. 27, 1994 [KR] Rep. of Korea .................. 94-18264

[51] Int. Cl.$^6$ ................................................ G11B 21/04
[52] U.S. Cl. ........................... 360/70; 360/73.06; 360/75; 360/73.07; 386/67; 386/80
[58] Field of Search ................... 360/10.1, 10.2, 360/10.3, 70, 73.06, 75, 73.05, 73.07, 64, 73.09, 73.11, 73.12; 386/67, 68, 78, 79, 80, 81

[56] References Cited

U.S. PATENT DOCUMENTS

| | | | |
|---|---|---|---|
| 4,306,254 | 12/1981 | Koda | 360/70 |
| 4,635,137 | 1/1987 | Matsumoto | 360/10.3 |
| 4,656,537 | 4/1987 | Toba | 360/70 |
| 4,716,473 | 12/1987 | Kondo | 360/70 |
| 5,138,504 | 8/1992 | Nishijima | 360/73.06 |
| 5,291,342 | 3/1994 | Kim | 360/64 X |

*Primary Examiner*—Aristotelis M. Psitos
*Assistant Examiner*—Alan Faber
*Attorney, Agent, or Firm*—Sughrue, Mion, Zinn, Macpeak & Seas, PLLC

[57] ABSTRACT

A video tape recorder for long-play mode recording/reproducing includes a capstan servo circuit including a N-multiplying means for inputting a capstan frequency signal and multiplying the input signal by N times, first switching means for switching each signal multiplied by the N-multiplying means according to a mode selecting signal for selecting a mode and down counting means for counting down the output signal of the first switching means, and a drum servo circuit including a synchronization dividing means for receiving a complex synchronous signal and dividing the input signal into a vertical and horizontal synchronous signal, drum reference frequency generating means for receiving the output signal of the synchronization dividing means and generating a drum reference frequency signal, delay means for delaying a drum phase signal by predetermined degrees, 180+θ° (here, θ is positive), and outputting the delayed signal and second switching means for selecting the drum phase signal or the delayed drum phase signal in response to a longest reproducing mode selecting signal. Therefore the recording and reproducing time can be controlled by N-multiplying.

5 Claims, 5 Drawing Sheets

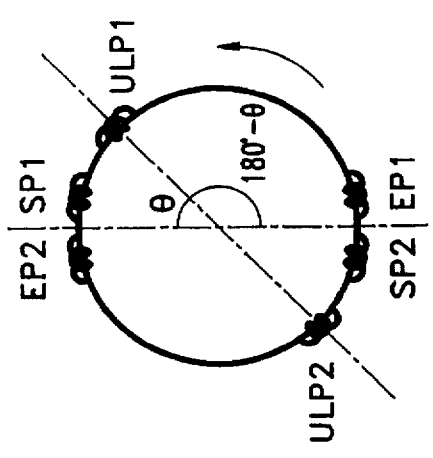
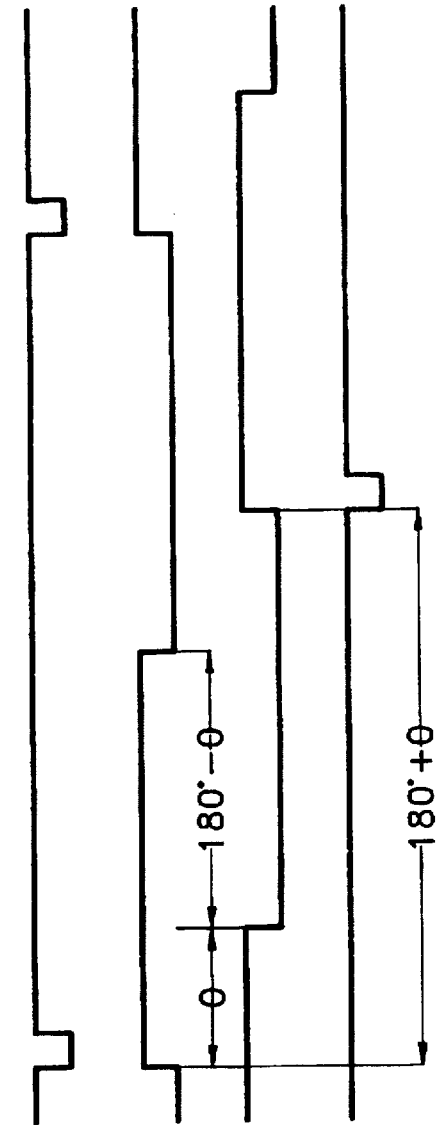
FIG. 5
FIG. 6A
FIG. 6B
FIG. 6C
FIG. 6D
FIG. 6E

VIDEO TAPE RECORDER FOR LONG-PLAY MODE RECORDING/REPRODUCING

BACKGROUND OF THE INVENTION

The present invention relates to a video tape recorder, and more particularly, to a video tape recorder for long-play mode recording and reproducing.

The capstan part of a conventional video tape recorder can be operated only in modes of SP (standard play), LP (long play) and SLP (super long play). Also, the ROM data of the C-FG (Center-Frequency) of a capstan-servo circuit consist of SP, LP and SLP modes.

In a conventional video tape recorder, long-play mode recording and reproducing cannot be performed for more than 6 hours with a 120 minute tape. Further, when an exclusive head for long-play mode recording and reproducing is additionally provided, there is no corresponding drum servo circuit.

SUMMARY OF THE INVENTION

To overcome the above problems, it is an object of the present invention to provide a video tape recorder in which long-play mode recording and reproducing can be performed to thereby select the period of tape operation.

To accomplish the object of the present invention, there is provided a video tape recorder for long-play mode recording and reproducing, which comprises: a capstan servo circuit including N-multiplying means for inputting a capstan frequency signal and multiplying the input signal by N times; first switching means for switching each signal multiplied by the N-multiplying means according to a mode selecting signal for selecting a mode; a down counting means for counting down the output signal of the first switching means; a drum servo circuit including a synchronization dividing means for receiving a complex synchronous signal and dividing the input signal into a vertical and horizontal synchronous signal; a drum reference frequency generating means for receiving the output signal of the synchronization dividing means and generating a drum reference frequency signal; delay means for delaying a drum phase signal by a predetermined number of degrees, 180+θ° (here, θ is positive), and outputting the delayed signal; and second switching means for selecting the drum phase signal or the delayed drum phase signal in response to a longest reproducing mode selecting signal.

BRIEF DESCRIPTION OF THE DRAWINGS

The above objects and advantages of the present invention will become more apparent by describing in detail a preferred embodiment thereof with reference to the attached drawings in which:

FIG. 5 is a diagram illustrating the structure of a head for long-play mode recording and reproducing.

FIGS. 6A-6E are timing diagrams of each portion shown in FIG. 4.

DETAILED DESCRIPTION OF THE INVENTION

A video tape recorder of the present invention is explained referring to the attached drawings as follows. A conventional video tape recorder can be operated in three modes such as SP, LP and SLP. Therefore, although the recorder operates in SLP mode with a 120 minute-tape, maximum recording/reproducing time is only 6 hours.

Figure 1:
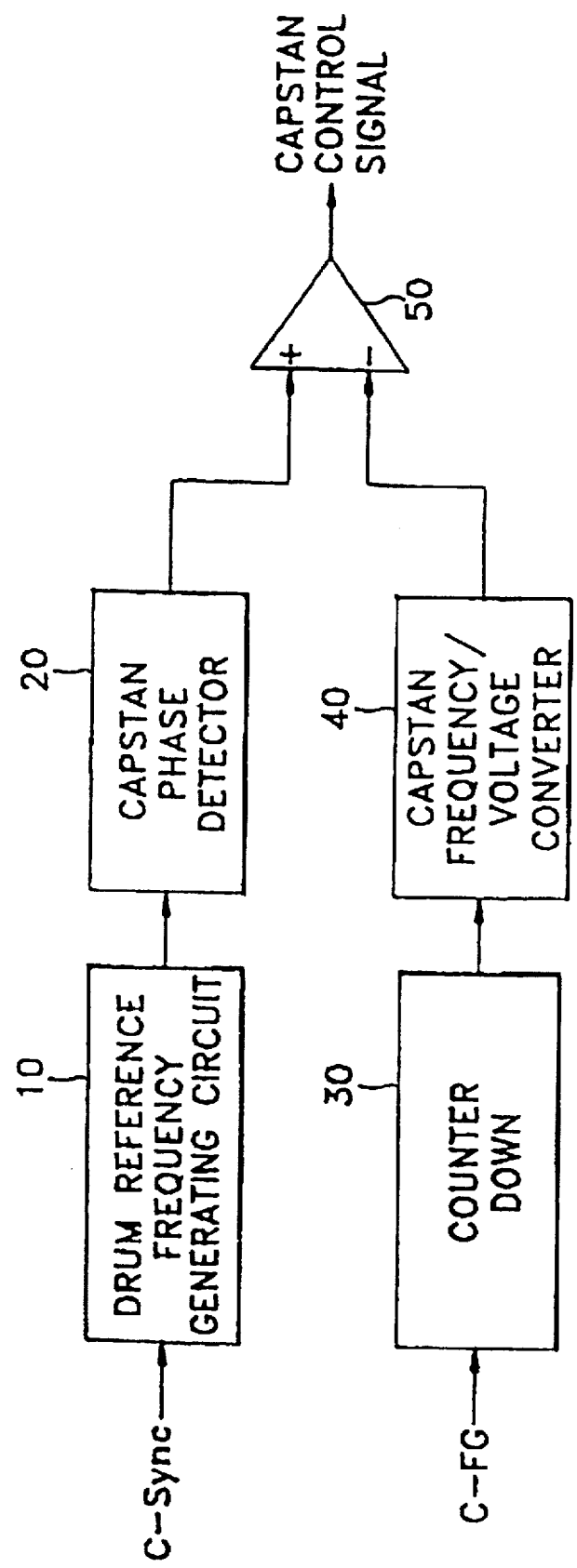
FIG. 1 is a block diagram of a capstan servo circuit according to the present invention.

In the video tape recorder of the present invention, the traveling velocity of the tape can be varied according to the selection of tape operation time as 3/2, 4/3 or 2 times that for a 120 minute tape in the conventional SLP mode. When a 120 minute tape is used, the tape can be recorded or reproduced for 9 hours if the 3/2 times mode is selected. This is '9 H mode'. If the 4/3 times mode is selected, the tape can be recorded or reproduced for 8 hours. This is '8 H mode'. If the 2 times mode is selected, the tape can be recorded or reproduced for 12 hours. This is '12 H mode'. Any of modes whereby the tape operation is longer than the conventional SLP mode is an ultra long play (ULP) mode;

In FIG. 1, a capstan servo circuit consists of a drum reference frequency generating circuit 10, a capstan phase detector 20, a counter down 30, a capstan frequency/voltage converter 40, and a comparator 50.

Figure 2:
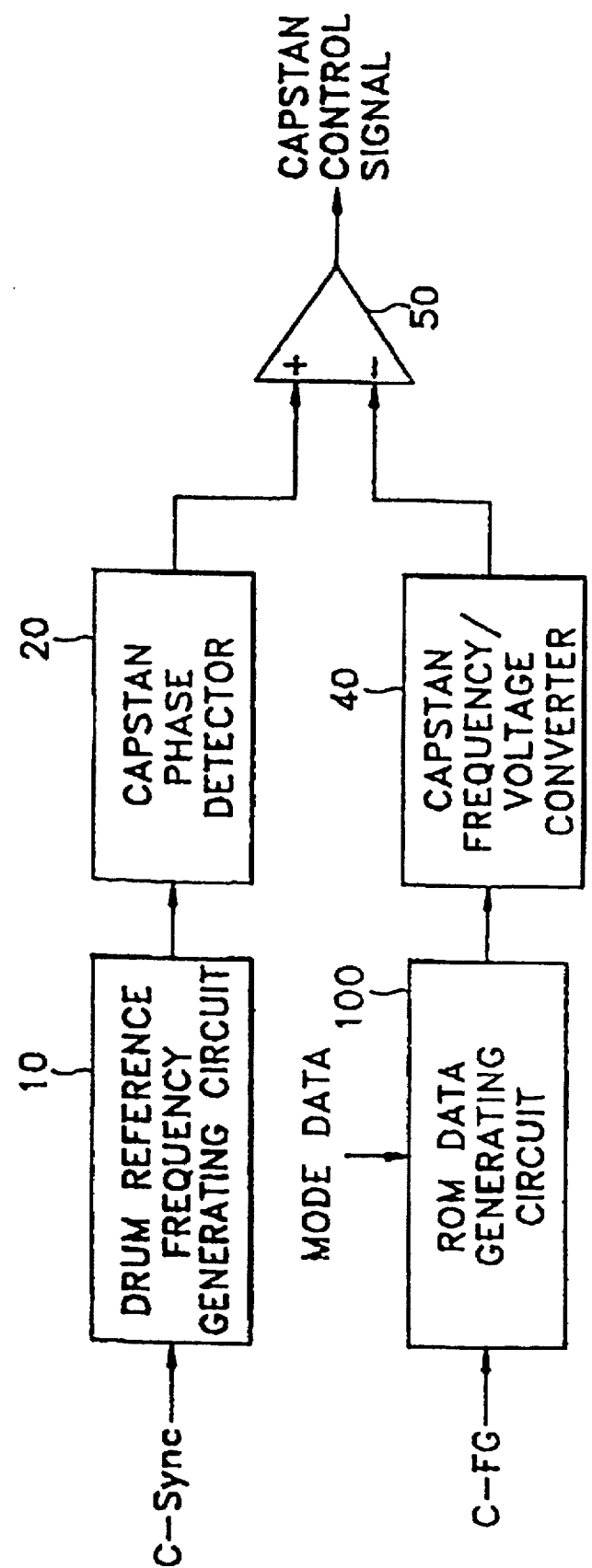
FIG. 2 is a diagram illustrating a ROM data generating circuit substituted for a counter down in FIG. 1 for long-play mode recording and reproducing according to the present invention.

The ROM data generating circuit 100 shown in FIG. 2 receives the Central Frequency (C-FG) of the capstan servo circuit and mode data, and generates the ROM data by ULP (ultra long play) mode according to mode data.

The method for setting the ROM data values of the signal FG is as follows. In the case where the ROM data value of the central frequency of normal SLP mode is M[Hz], the ROM data value of the central frequency of each mode among ULP modes is M/N[Hz] when the tape velocity is 1/N times that of the SLP mode.

For example, in the case where the 120 minute tape, in SLP mode, is used for 9 hours (9 H mode), the tape traveling velocity is 1/N=6 H/9 H=2/3 times that in SLP mode. When the central frequency is 360 [Hz] in SLP mode, M=360, the ROM data value of the central frequency of 9 H mode is set as 360×2/3 =240 [Hz].

In this manner, when the 120 minute tape is used in SLP mode for 8 hours (8 H mode), the ROM data value on the central frequency is set as 360×3/4=270 [Hz].

The mode data value shown in FIG. 2, which indicates the operating mode of the video tape recorder, is generated from a microcomputer (not shown).

Figure 3:
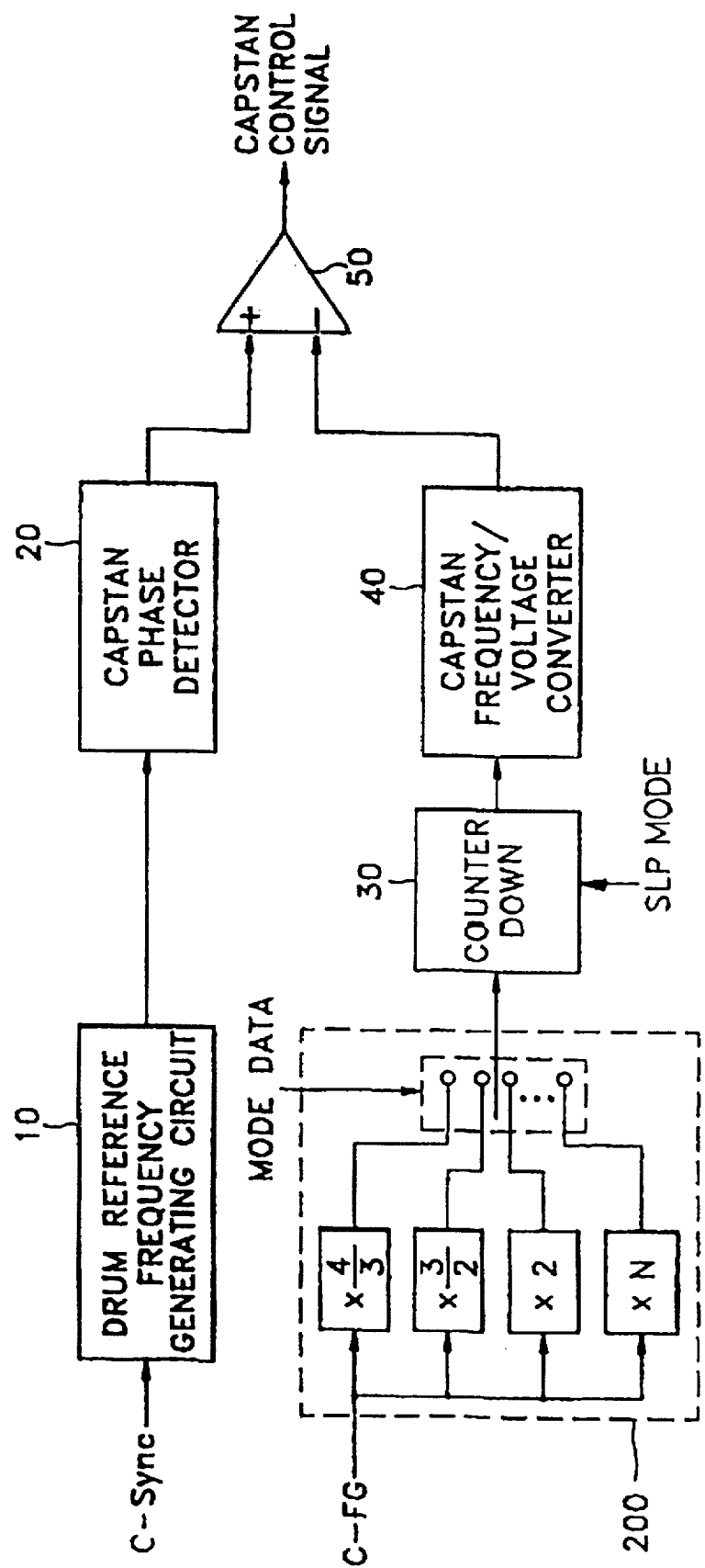
FIG. 3 is a block diagram illustrating additionally provided N-multiplying means prior to the counter down shown in FIG. 1.

N-multiplying means 200 shown in FIG. 3 multiplies the sinusoidal wave signal input corresponding to the central frequency fitted into the ULP mode, and counter down 210 varies the capstan velocity. N-multiplying means 200 receives the mode data from an external microcomputer and the ROM data of the central frequency of the counter down 210 are selected from values of SLP (super long play) mode for the counter down 210 in order to change the capstan velocity on the basis of the conventional SLP mode.

In FIG. 3, in case that the traveling velocity of tape is decreased into 1/N times that of the SLP mode, the ROM data values of the central frequency are selected as values of the conventional SLP mode, and the frequency of the sinusoidal wave signal input corresponding to the central frequency is changed into a desired frequency. That is, the frequency of the sinusoidal wave signal is multiplied by N times.

For example, in case the frequency is multiplied by M×4/3times in 8 H mode, by M×3/2 in 9 H mode and by M×2 in 12 H mode, respectively, the down counter down 210 compares the original ROM data values of the central frequency of the SLP with the frequency of the sinusoidal wave signal which is received corresponding to the central frequency, and the capstan velocity becomes slow since the frequency of the input sinusoidal wave signal is larger than the ROM data value. Finally, the tape travels at the central frequency velocity which is M×N times.

Figure 4:
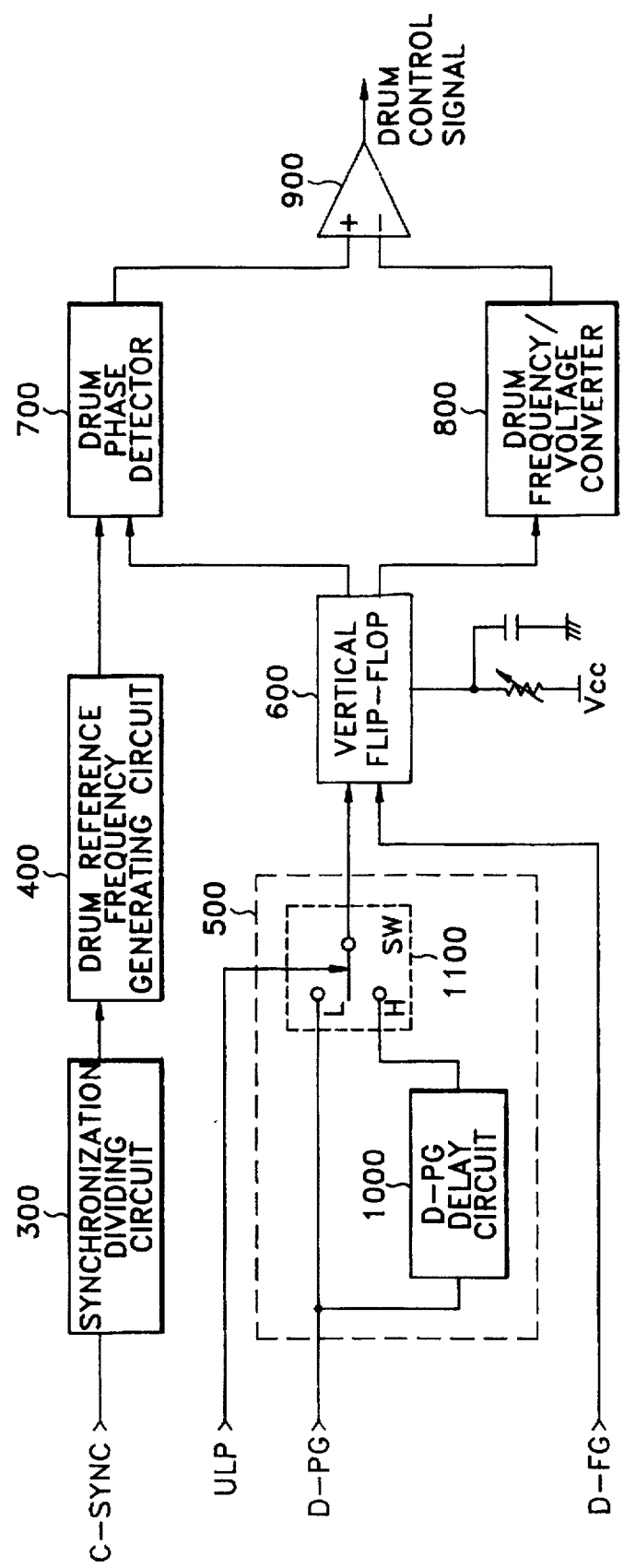
FIG. 4 is a block diagram of a drum servo circuit of a video tape recorder for long-play mode recording and reproducing of the present invention.

The drum servo circuit shown in FIG. 4 consists of a synchronization dividing circuit 300, a drum reference frequency generating circuit 400, a drum phase generator 500, a vertical flip-flop (V-FF) 600, a drum phase detector 700, a drum frequency/voltage converter 800 and a comparator 900. The drum phase generator 500 consists of a drum phase delay circuit 1000 and a switch 1100.

The structure of a head for long-play mode recording and reproducing is shown in FIG. 5 and the heads ULP1 and ULP2 are for long-play mode recording and reproducing. Here, the exclusive head for ULP is used separately from the conventional double azimuth(D/A) 4 heads, to thereby prevent the deterioration of the picture quality due to multi-functional performance when one of D/A 4 heads is used for long-play mode recording and reproducing. In FIG. 5, the heads ULP1 and ULP2 are located apart from the heads SP and EP by θ°.

FIG. 6A is a timing diagram of a drum-frequency signal D-FG, FIG. 6B is a timing diagram of a drum-phase signal D-PG, FIG. 6C is a timing diagram of a signal V-FF, FIG. 6D is a timing diagram of a signal V-FF', where signals V-FF and V-FF' are output from the V-FF generating circuit, and FIG. 6E is a timing diagram of a signal D-PG' output from the D-PG delay circuit.

The operation of the circuit shown in FIG. 4 is explained as/follows referring to FIGS. 6A~6E;

In the structure of the conventional D/A 4 heads, the V-FF signal shown in FIG. 6C is output according to the D-FG and D-PG signals shown in FIG. 6A and FIG. 6B, respectively. In a mode which uses the ULP1 head or the ULP2 head, the V-FF' signal shown in FIG. 6D is produced according to the D-FG and D-PG' signals shown in FIG. 6A and FIG. 6E, respectively. During recording using the conventional D/A 4 heads, switch 1100 becomes low, as shown in FIG. 4, and V-FF 600 shown in FIG. 6C outputs a V-FF signal on the basis of the D-PG signal shown in FIG. 6B. Drum phase detector 700 receives the drum reference frequency output from the drum reference frequency generating circuit 400 and the V-FF signal shown in FIG. 6C and detects the phase from them. Comparator 900 compares the signal output from the drum phase detector 700 with that output from the drum frequency/voltage converter 800 and outputs a drum control signal. By the drum control signal, the head switching signal and the vertical synchronization signal are recorded on tape at a constant interval selected among 5 H~8 H.

In the ULP mode, the externally output ULP mode selecting signal shown in FIG. 4 causes switch 1100 to become 'high', and D-PG delay circuit 1000 receives the D-PG signal shown in FIG. 6B and delays the input signal by 180+θ°. Such a delay is required since switching of the ULP head is accomplished earlier than that of D/A 4 heads by 180−θ° when the drum shown in FIG. 5 rotates in the direction shown by the arrow. Accordingly, the head switching signal should go in advance of the conventional D/A 4 heads switching signal by 180−θ° or should be delayed by 360−(180−θ°), 180+θ°. Since the reference signal for delaying the head switching signal by 180+θ° is the D-PG signal, the head switching signal is delayed as the delay of the D-PG signal by 180+θ°. The subsequent process is the same as that in the conventional D/A 4 head.

The width of the video track is 58 μm in SP mode and 19.3 μm in SLP mode.

Since the track width is 19.3×3/4=14.5 μm in 8 H mode in which the tape velocity is 4/3 times that in SLP mode, the head width is properly selected in the range of 14.5~29 μm in consideration of the azimuth degree, and the picture quality.

In 9 H mode, the head width is in the range of 12.9~25.8 μm. In general, in TH mode, the video track width becomes 19.3×6/T μm and the head width is properly selected between 115.8/T and 231.6/T μm.

Also, the long-play recording and reproducing mode can be established by changing the ROM data of the conventional servo circuit about the central frequency of the capstan or adding the external circuit without changing the conventional servo circuit.

Additionally, as shown in FIG. 4, the exclusive head for long-play recording and reproducing can be controlled by the method of delaying the D-PG in the conventional servo circuit or adding the delay circuit in an integrated circuit. In this case, the synchronization clock signal in the D-PG delay is made to be delayed by a desired amount using the D-FG.

Therefore, the video tape recorder (VTR) of the present invention has the effects of reducing the amount of tape required for recording and of enhancing the continuity of the reproduced program by recording a lengthy video program of TV over 6 hours on only one tape.

What is claimed is:

1. A video tape recorder for ultra long-play mode recording/reproducing comprising:

a drum having a plurality of heads, including two ULP (ultra-long play) heads for recording/reproducing a video signal and a plurality of heads for recording/reproducing in at least one of a standard play mode, a long play mode and a super long play mode;

a capstan servo circuit including N-multiplying means for inputting a capstan frequency signal and multiplying the input signal by N times, first switching means for switching each signal multiplied by said N-multiplying means according to a mode selecting signal for selecting a mode, counting down means for down counting the output signal of said first switching means, and a capstan servo driver for outputting a capstan control signal in response to a signal output by said counting down means, wherein N signifies a ratio of a tape travelling speed of a super long play mode and of a tape travelling speed of an ultra long play mode; and a drum servo circuit including synchronization dividing means for receiving a complex synchronous signal and dividing the input signal into a vertical and horizontal synchronous signal, drum reference frequency generating means for receiving the output signal of said synchronization dividing means and generating a drum reference frequency signal, delay means for delaying a drum phase signal by a predetermined number of degrees, 180+θ° (here, θ is positive), and outputting the delayed drum phase signal, second switching means for selecting one of said drum phase signal and said delayed drum phase signal in response to the mode selecting signal, a vertical flip-flop means for producing a flip-flop signal in response to the selected one of said drum phase signal and said delayed drum phase signal, a drum phase detector means for outputting a drum phase detection signal in response to the flip-flop signal and the drum reference frequency signal, a drum frequency/voltage converter means for outputting a voltage signal in response to the flip-flop signal, and a drum control signal generating means for outputting a drum control signal in response to the drum phase detection signal and the voltage signal output by said drum frequency/voltage converter means, whereby when the mode selecting signal indicates the ultra long play mode, the capstan control signal is output corresponding to the tape travelling speed of the ultra long play mode and the drum control signal contains information for causing the ULP heads to record/reproduce the video signal.

2. A video tape recorder for ultra long-play mode recording/reproducing according to claim 1 wherein θ represents a separation between one of the ultra long-play mode heads for recording/reproducing in the ultra long-play mode and one of the plurality of heads for recording/reproducing in at least one of a standard play mode a long play mode and a super long play mode.

3. A video tape recorder having two ultra long-play mode heads for ultra long-play mode recording/reproducing and a plurality of heads for recording/reproducing in at least one of a standard play mode, a long play mode and a super long play mode, comprising a drum servo circuit including:

synchronization dividing means for receiving a complex synchronous signal and dividing the input signal into a vertical and horizontal synchronous signal;

drum reference frequency generating means for receiving the output signal of said synchronization dividing means and generating a drum reference frequency signal;

delay means for delaying a drum phase signal by a predetermined number of degrees, 180+θ° (here, θ is positive), and outputting the delayed drum phase signal;

switching means for selecting one of said drum phase signal and said delayed drum phase signal in response to a mode selecting signal; and drum control signal generating means for generating a drum control signal in response to the drum phase signal selected by said switching means so that the two ultra long-play mode heads are used for recording/reproducing when the delayed drum phase signal is selected.

4. A video tape recorder for long-play mode recording/reproducing according to claim 3 wherein θ represents a separation between one of the ultra long-play mode heads for recording/reproducing in the ultra long-play mode and one of the plurality of heads for recording/reproducing in at least one of a standard play mode a long play mode and a super long play mode.

5. A video tape recorder having at least two heads for Use during an ultra long-play recording/reproducing mode, comprising a drum servo circuit including:

synchronization dividing means for receiving a complex synchronous signal and dividing the input signal into a vertical and horizontal synchronous signal;

drum reference frequency generating means for receiving the output signal of said synchronization dividing means and generating a drum reference frequency signal;

delay means for delaying a drum phase signal by a predetermined number of degrees, 180+θ° (here, θ is positive), and outputting the delayed drum phase signal;

switching means for selecting one of said drum phase signal and said delayed drum phase signal in response to a mode selecting signal;

a vertical flip-flop means for producing a flip-flop signal in response to the selected one of said drum phase signal and said delayed drum phase signal;

a drum phase detector means for outputting a drum phase detection signal in response to the flip-flop signal and the drum reference frequency signal;

a drum frequency/voltage converter means for outputting a voltage signal in response to the flip-flop signal; and a drum control signal means for outputting a drum control signal in response to the drum phase detection signal and the voltage signal output by said drum frequency/voltage converter means, whereby when the mode selecting signal indicates the ultra long-play mode, the capstan control signal is output corresponding to the tape travelling speed of the ultra long play mode and the drum control signal contains information for causing the ultra long-play mode heads to record/reproduce a video signal.

* * * * *